July 14, 1959 R. E. SCOTT 2,894,301
FASTENER
Filed Sept. 25, 1951
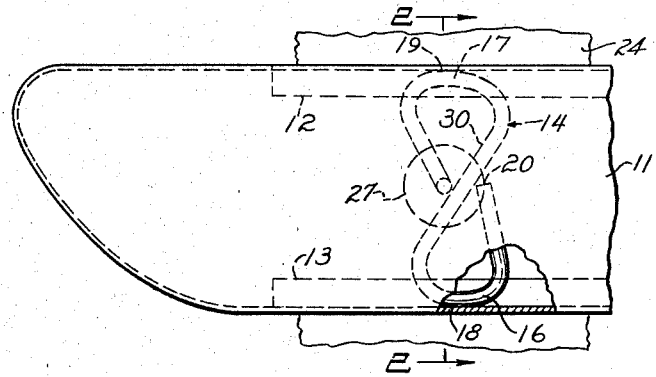
Fig. 1
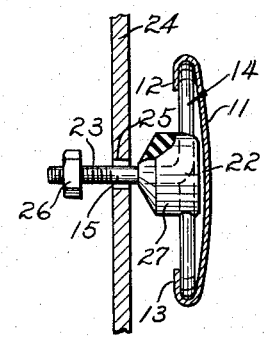
Fig. 2
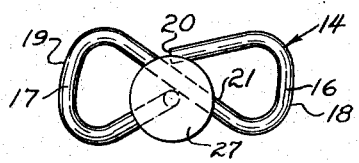
Fig. 3
Fig. 4
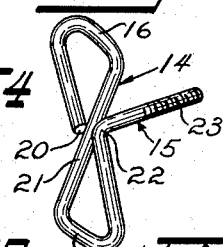
Fig. 6
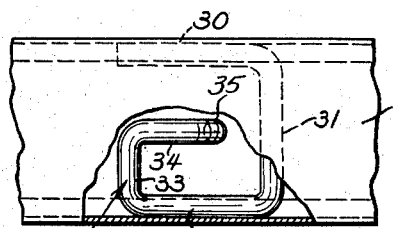
Fig. 5
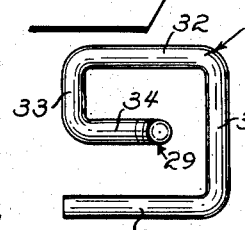
Fig. 7
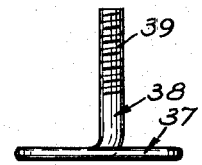
Fig. 8
Fig. 10
INVENTOR
ROBERT E. SCOTT
BY Strauch, Nolan + Diggins
ATTORNEYS

United States Patent Office 2,894,301
Patented July 14, 1959

2,894,301

FASTENER

Robert E. Scott, Detroit, Mich., assignor to Gagnier Fibre Products Company, Detroit, Mich., a corporation of Michigan Application September 25, 1951, Serial No. 248,258

1 Claim. (Cl. 24—73)

This invention relates to metal fasteners and particularly to fasteners for attaching and retaining moulding as upon an automobile body.

This is a continuation-in-part of my copending application Serial No. 235,680 filed July 9, 1951.

Prior to the invention conventionally used fasteners for this purpose comprised special sheet metal heads having separate rigidly attached bolts for securing them to the support structure. These were made by providing a sheet metal blank head and punching, trimming and forming the blank to provide a bolt receiving aperture and arms that interfit with the moulding, which operations involved considerable labor and waste of metal.

This invention contemplates a novel fastener wherein the head and an attachment shank are entirely formed of a length of metal and involves no trimming or other waste of metal.

It is a major object of this invention to provide a novel moulding or like fastener wherein the head is formed of suitably formed length of metal and an attachment shank rigidly projects from the head at a desired angle.

It is a further object of the invention to provide a novel fastener for moulding or the like having a large area head formed of a length of metal suitably extending in a plane and having a threaded or equivalently formed attachment shank projecting from the plane of the head.

It is a further object of the invention to provide a novel fastener having a head structure formed of a suitably shaped continuous length of metal with a threaded or equivalent shank projecting therefrom and having a body of soft tough flexible plastic sealing material surrounding the juncture of the shank with the head.

It is a further object of the invention to provide a novel fastener for mouldings or the like wherein a length of metal is formed in a plane to provide a head of suitable size and shape and then projects at one end at an angle to the head and is threaded or similarly formed for attachment to a support structure.

Further objects of the invention will appear as the description continues with reference to the appended claims and the annexed drawings wherein:

Figure 1 is an elevation showing the end of a strip of moulding as attached by a preferred embodiment of the invention;

Figure 2 is a section on line 2—2 of Figure 1 illustrating further the fastener of Figure 1 and its association with the moulding just before being drawn tight on the support;

Figure 3 is a top plan view of the fastener of Figure 1;

Figure 4 is a pictorial view of the integral metal portion of the fastener of Figure 1, the sealing plug being omitted to show the integral shank more clearly;

Figure 5 is an elevation illustrating a section of moulding held in place by a fastener according to a further embodiment of the invention;

Figure 6 is a plan view of the one-piece fastener element of Figure 5;

Figure 7 is a side elevation of the fastener element of Figure 6;

Figure 8 is a plan view of a still further embodiment of the invention wherein the one-piece fastener element is like that of Figure 5–7 but has a flattened side head;

Figure 9 is a side elevation of the element of Figure 8; and

Figure 10 is a section through line 10—10 of Figure 8, illustrating the flat section of the sides of the head and the inwardly projection arm in this embodiment.

Referring to Figures 1–4, the fastener comprises essentially a single length of metal shaped to form a substantially flat head of an extent suitable for frictional attachment to the moulding, and one end of the length of metal projects at an angle to the head to provide an integral attachment shank for entering an aperture in a support structure.

A strip 11 of usual decorative automobile body moulding is made of fairly light gauge sheet metal. Its outer chromium plated side surface is smooth. Its inner side is open with flanges 12 and 13 projecting toward each other to define a longitudinal channel. The head of the fastener is frictionally received within this channel as shown in Figure 2.

This fastener comprises a head 14 and a shank 15. Head 14 comprises a single length of metal that turns at opposite end portions to provide oppositely extending arms 16 and 17 that are substantially closed loops which lie substantially in a plane. As shown in Figure 3, the top of this fastener head appears substantially as a figure eight, and as shown in Figure 2 the head is a substantially flat structure that lies substantially in a plane.

Peripheral surfaces 18 and 19 on the outer ends of the arm loops 16 and 17 are spaced far enough to respectively frictionally engage strip 11 within the channel. The metal is stiff enough to rigidly retain its given bent shape so that it functions for the purpose as well as if arms 16 and 17 were solid metal areas.

Adjacent the end which lies near the middle of the intermediate straight section 21 and substantially at the central region of the head 14, the length of metal extends out of loop 17 at 22 and projects away from the plane of the head, the end portion at least of this projecting shank being threaded at 23. In the illustrated embodiment, shank 15 projects at right angles to the plane of the head but it may be bent at any suitable angle to the head at 22 by manipulation with pliers or other tools, depending upon the association of the moulding with the support structure. The shank thus can be arranged at any desired angle to the head without distortion of the head area or shape or changing in any way the fit of the head with the moulding.

Figure 2 illustrates how the fastener is mounted upon a support structure 24 such as an automobile body wall having an aperture 25 through which projects shank 15 for receiving a nut 26. When nut 26 is tightened the fastener and moulding are tightly drawn against the support 24.

Preferably I surround the upper end of shank 15 with a plug 27 of some soft, tough resilient elastic material such as synthetic rubber or one of the rubber-like plastics. The upper end of the plug may be moulded over the central part of the fastener head 14 at its juncture with shank 15 so as to permanently bond it to the head. When the fastener is drawn tight by nut 26, the plug 27 engages and is compressed around and particularly within aperture 25 so that aperture 25 is sealed against passage of water therethrough. Plug 27 also serves as a resilient shock absorbing washer in the assembly, and when compressed in the assembly acts to frictionally bind the parts together.

The shape of the head may be varied to suit the moulding attached to the support structure, but in all fasteners of the invention the length of metal so extends as to define a rigid head structure of adequate area and peripheral dimensions to properly interfit with the moulding without further mechanical modifications or attachments and without trimming or wasting metal. The plug 27 may be eliminated in some locations where sealing is not important.

Figures 5, 6 and 7 illustrate another embodiment of the invention. The flanged moulding 11 is frictionally engaged with a fastener comprising a flat head 28 and an integral projecting shank 29.

The fastener comprises a single length of stiff metal which in head 28 forms sides 30, 31, 32 and 33, substantially defining a rectangular outline head. Side 33 extends as a short arm 34 inwardly in the plane of the head and, near the center of the head, turns at 35 at an angle to the plane of the head to provide integral shank 29 formed with a threaded end portion 36.

While this fastener of Figures 5-7 is preferably formed from a suitably bent length of circular cross-section wire, it may be fabricated from sheet metal.

The fastener illustrated in Figures 8 and 9 is of the same shape as that of Figures 5-7 but the sides of head 37 are flattened and non-circular in cross-section as illustrated in Figure 10, while the integral attachment shank 38 that projects from the plane of the head is circular in cross-section and threaded at its outer end at 39. Head 37 comprises sides 41, 42 and 43 forming three sides of a rectangular head. The fourth side comprises aligned portions 44 and 45 extending toward each other from the ends of sides 41 and 43 respectively. Side portion 45 is turned inwardly at 46 substantially where it approaches the end of side portion 44 to form the inwardly extending arm 47. At substantially the center of the head 37, shank 38 projects integrally and angularly from arm 47.

This fastener provides a substantially closed outline head, the sides of which and arm 47 are flat so as to approximate a planar head adapted to frictionally interfit with the moulding strip.

I have therefore provided a novel and extremely practical one-piece metal fastener wherein the head and attachment shank comprise a single continuous length of metal. This length of metal may comprise a continuous section of wire of such stiffness as to retain a given shape when bent to form the head, of round or any desired cross-section. On the other hand, the length of metal may comprise a piece of sheet metal or any one-piece continuous metal member of suitable shape and rigidity, with the head formed by stamping, bending or by any other metal working process. Further the integral shank may be threaded, serrated or formed in any suitable manner for attachment to a support. Also while I have disclosed head structure of substantially figure eight and rectangular contour for illustrating the invention, it will be apparent that head structures of any suitable size and shape to be received by the mouldings are within the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

A rigid self-sealing fastener for attaching strip moulding and the like to a supporting structure having a series of holes comprising a single length of stiff metal looped at one end substantially in a plane to form a relatively large rigid moulding clamping head of desired shape and with its other end projecting as a straight and rigid shank substantially at a right angle from the center of said head and having a nut receiving threaded terminal section, and a body of soft deformable material appreciably smaller than said head permanently mounted on said fastener about the juncture of said head and shank whereby, when said fastener head is disposed within a moulding strip and said shank is projected through a hole in the supporting structure, tightening of a nut of the threaded end of the shank will draw the moulding tight upon said structure and urge said deformable body to seal the hole surrounding said shank.

References Cited in the file of this patent

UNITED STATES PATENTS

| Number | Name | Date |
|---|---|---|
| 42,077 | Chess | Mar. 29, 1864 |
| 183,038 | Baird | Oct. 10, 1879 |
| 912,078 | Cook | Feb. 9, 1909 |
| 1,387,217 | Watters | Aug. 9, 1921 |
| 1,432,243 | Harris | Oct. 17, 1922 |
| 1,679,266 | Place | July 31, 1928 |
| 1,896,590 | Place | Feb. 7, 1933 |
| 1,987,048 | Brunst | Jan. 8, 1935 |
| 2,124,252 | Lavigne | July 19, 1938 |
| 2,136,981 | Place | Nov. 15, 1938 |
| 2,197,590 | Place | Apr. 16, 1940 |
| 2,229,708 | Tinnerman | Jan. 28, 1941 |
| 2,326,455 | Gray | Aug. 10, 1943 |
| 2,439,516 | Holcomb | Apr. 13, 1948 |
| 2,528,288 | Rublee | Oct. 31, 1950 |